UNITED STATES PATENT OFFICE 2,531,405

BIGUANIDE DERIVATIVES

Francis Henry Swinden Curd, deceased, late of Blackley, Manchester, England, by Muriel Ruth Curd, executrix, Bramhail, England, and Francis Leslie Rose, Blackley, Manchester, England, assignors to Imperial Chemical Industries Limited, a corporation of Great Britain No Drawing. Continuation of application Serial No. 755,710, June 19, 1947. This application July 25, 1949, Serial No. 106,748. In Great Britain October 8, 1945

10 Claims. (Cl. 260—565)

This invention relates to new compounds and more particularly it relates to compounds which are useful as antimalarial agents. The present application is a continuation of application Serial No. 755,710, now abandoned, which itself is a continuation-in-part of copending applications Serial Nos. 701,094, 718,594, 720,096 and 723,450, all now abandoned.

An object of the present invention is to provide new compounds having chemotherapeutic properties and being useful in the treatment of malaria. Other and further important objects of this invention will appear as the description proceeds.

These objects are attained by the present invention according to which there are provided new biguanide derivatives of the general formula

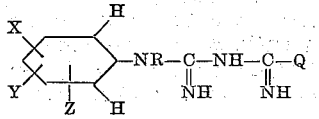

wherein Z represents an atom selected from the group consisting of bromine and iodine and X and Y represent atoms or radicals selected from the group consisting of hydrogen, halogen and alkyl radicals of 1–3 carbon atoms, Q represents the radical of a nitrogenous base for example a monoalkylamine or a dialkylamine, provided that the number of carbon atoms contained in Q is more than one and fewer than 8, and R represents an atom or radical selected from the group consisting of hydrogen and alkyl radicals of 1–3 carbon atoms.

The new biguanide derivatives may be made for example by the method described in U. S. Patent No. 2,467,371, viz., by causing a substituted aryldicyandiamide of the formula:

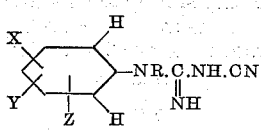

wherein X, Y, Z and R have the significance indicated above, to react with a nitrogenous base of the formula QH, wherein Q has the significance given above. The reaction may conveniently be brought about by heating the reagents together, if desired in presence of a solvent or diluent which for convenience may be an excess of the nitrogenous base QH when this is liquid under the conditions of reaction employed.

The nitrogenous compound QH may be used either in the form of the free base or in the form of a salt for example the hydrochloride. Further the reaction may advantageously be carried out in the presence of a metal such as zinc or copper which may be used as such or in the form of an oxide, hydroxide or salt or as a pre-formed addition compound with the amine. There may be used for instance copper powder, hydrated copper oxide, copper sulphate or zinc chloride. In such cases the presence of the metal increases the speed of the reaction and improves the yield of the biguanide. Also the biguanide can frequently be conveniently isolated directly from the reaction mixture in the form of a sparingly soluble complex with the metal salt.

The biguanide derivatives of the present invention may also be made by the process described in co-pending application Serial No. 701,094 viz., by causing a substituted dicyandiamide of the formula

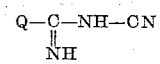

wherein Q has the significance given above to react with an arylamine of the formula

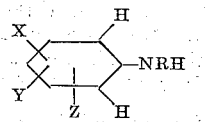

wherein X, Y, Z and R have the significance given above. This reaction may conveniently be brought about by heating the substituted dicyandiamide with a salt, for example the hydrochloride of the arylamine in presence of a solvent, conveniently for example water or other hydroxylic solvent for example β-ethoxyethanol.

Again the biguanide derivatives of the present invention may be made by the processes described in copending application No. 718,594, viz. by interaction of a guanidine derivative of the formula:

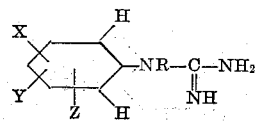

wherein X, Y, Z and R have the significance given above, with a cyanamide derivative of the formula: Q—CN, wherein Q has the significance stated above, or by interaction of a guanidine derivative of the formula:

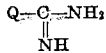

wherein Q has the significance stated above, with a cyanamide derivative of the formula:

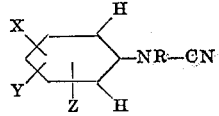

wherein X, Y, Z and R have the significance stated above.

These reactions may conveniently be effected by heating the reagents together, optionally in the presence of a solvent or diluent. The guanidine derivative may be used in the form of the free base or, if desired, as a salt such as the hydrochloride, carbonate or sulphate. Where the cyanamide is mono-substituted (and hence acidic in nature) it may, if desired, be used in the form of a salt with a base, the guanidine derivative being then used also in the form of a salt.

Alternatively the new biguanide derivatives of the present invention may be made by the processes described in copending application Serial No. 720,096, viz. firstly by interaction of an S-substituted guanylisothiourea of the formula:

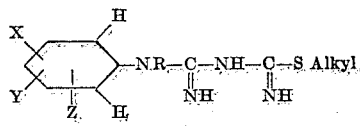

wherein X, Y, Z and R have the significance given above, with an amine of the formula QH, wherein Q has the significance given above, or by interaction of the same amine, QH with a guanylthiourea of the formula:

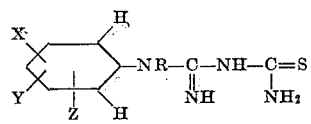

wherein X, Y, Z and R have the significance given above, in presence of a desulphurising agent such as the oxides and salts of the heavy metals, particularly those of lead, copper, silver and mercury; or, secondly, by interaction of an S-substituted guanylisothiourea of the formula:

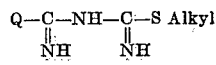

wherein Q has the significance stated above, with an amine of the formula:

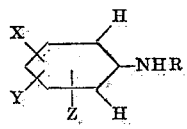

wherein X, Y, Z and R have the significance stated above, or by interaction of the same amine:

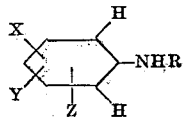

with a guanylthiourea of the formula:

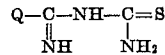

wherein Q has the significance stated above, in the presence of a desulphurising agent.

Or again a guanylthiourea of the formula:

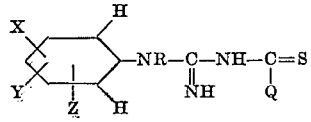

may be reacted with ammonia in presence of a desulphurising agent, or, yet again, a guanylthiourea of the formula:

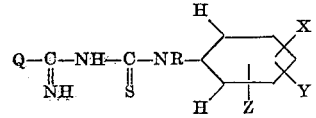

may be reacted with ammonia in the presence of a desulphurising agent.

The reaction in these processes may be brought about by heating the reagents together. Conveniently this may be carried out in presence of a solvent or diluent, advantageously a hydroxylic organic solvent, for example methanol, ethanol or β-ethoxyethanol. Alternatively an excess of the amino compound, when that is liquid, may be used as the solvent or diluent. The guanylthiourea, or the corresponding S-alkylguanylisothiourea, may be used as such or it may be used in the form of its salts, for example the hydrochloride. In the latter event the free thiourea may be liberated in situ by the addition of, as basifying agent, an equivalent amount of for example sodium ethoxide or sodium methoxide. Again the basifying agent may, if desired, be merely an excess of the amino compound.

By yet a further alternative the new biguanides of the present invention may be made by the processes described in copending application Serial No. 723,450, viz. firstly by interaction of a guanidine derivative of the formula:

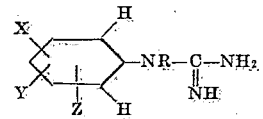

wherein X, Y, Z and R have the significance stated above, either with an S-substituted isothiourea of the formula:

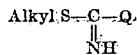

wherein Q has the significance stated above, or with a thiourea of the formula:

wherein Q has the significance stated above, and a desulphurising agent or secondly, by interaction of a guanidine derivative of the formula:

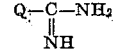

wherein Q has the significance stated above, either with an S-substituted isothiourea of the formula:

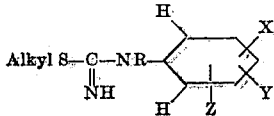

wherein X, Y, Z and R have the significance stated above, or with a thiourea of the formula:

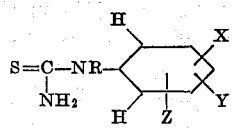

wherein X, Y, Z and R have the significance stated above, and a desulphurising agent.

These processes may be brought about by heating the reagents together. Conveniently this is carried out in presence of a solvent or diluent, advantageously a hydroxylic organic solvent for example methanol, ethanol or β-ethoxyethanol. The thiourea, or the corresponding S-alkylisothiourea, may be used as such as it may be used in the form of its salts, for example the hydrochloride. In the latter event the free thiourea may be liberated in situ by the addition of, as basifying agent, an equivalent amount of, for example, sodium ethoxide or sodium methoxide.

The novel compounds of this invention are all characterised by a common structure, as expressed by the above general formula, and by substantially common physical and chemical characteristics. Outstanding among their properties is the pharmaceutical property of being excellent antimalarial agents. Our novel compounds thus constitute synthetic substitutes for quinine. While the degree of efficacy as an antimalarial agent will, of course, vary from one individual compound to the next, we have tested so large a number of members of the general class against avian malaria that it may safely be postulated that all the compounds of the class have antimalarial properties.

Among the numerous compounds tested against *Plasmodium gallinaceum* infection of chicks the following substances have been found to be active against both the erythrocytic and exoerythrocytic forms of the parasite:

$N^1$-p-bromophenyl-$N^5$-ethylbiguanide

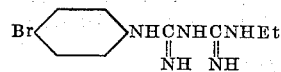

$N^1$-p-bromophenyl-$N^5$-n-propylbiguanide
$N^1$-p-bromophenyl-$N^5$-n-butylbiguanide
$N^1$-p-bromophenyl-$N^5$-sec.butylbiguanide
$N^1$-p-bromophenyl-$N^5$-diethylbiguanide

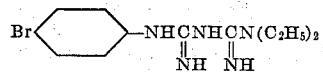

$N^1$-p-bromophenyl-$N^5$-methyl-$N^5$-isopropylbiguanide
$N^1$-p-bromophenyl-$N^5$-methyl-$N^5$-n-propylbiguanide
$N^1$-p-bromophenyl-$N^5$-methyl-$N^5$-n-butylbiguanide
$N^1$-m-iodophenyl-$N^5$-isopropylbiguanide

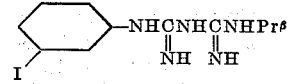

$N^1$-p-iodophenyl-$N^5$-isopropylbiguanide
$N^1$-p-iodophenyl-$N^5$-n-propylbiguanide
$N^1$-p-iodophenyl-$N^5$-ethylbiguanide
$N^1$-p-iodophenyl-$N^5$-n-butylbiguanide
$N^1$-p-iodophenyl-$N^5$-methyl-$N^5$-isopropylbiguanide
$N^1$-p-iodophenyl-$N^5$-methyl-$N^5$-n-propylbiguanide
$N^1$-3:4-dibromophenyl-$N^5$-isopropylbiguanide

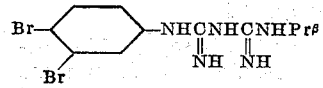

$N^1$-3-bromo-4-chlorophenyl-$N^5$-isopropylbiguanide
$N^1$-3-bromo-4-chlorophenyl-$N^5$-ethylbiguanide
$N^1$-3-bromo-4-chlorophenyl-$N^5$-methyl-$N^5$-isopropylbiguanide
$N^1$-3-bromo-4-iodophenyl-$N^5$-isopropylbiguanide
$N^1$-3-bromo-4-iodophenyl-$N^5$-methyl-$N^5$-isopropylbiguanide

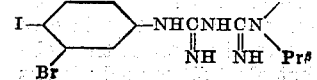

$N^1$-3-iodo-4-chlorophenyl-$N^5$-isopropylbiguanide

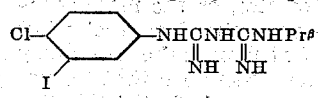

$N^1$-3-iodo-4-chlorophenyl-$N^5$-n-propylbiguanide
$N^1$-3-iodo-4-chlorophenyl-$N^5$-ethylbiguanide
$N^1$-3-iodo-4-chlorophenyl-$N^5$-methyl-$N^5$-n-propylbiguanide
$N^1$-3-iodo-4-bromophenyl-$N^5$-isopropylbiguanide
$N^1$-3-iodo-4-bromophenyl-$N^5$-methyl-$N^5$-n-propylbiguanide
$N^1$-3:4-diiodophenyl-$N^5$-isopropylbiguanide
$N^1$-3-chloro-4-bromophenyl-$N^5$-isopropylbiguanide
$N^1$-3-chloro-4-bromophenyl-$N^5$-n-propylbiguanide
$N^1$-3-chloro-4-bromophenyl-$N^5$-ethylbiguanide
$N^1$-3-chloro-4-bromophenyl-$N^5$-methyl-$N^5$-isopropylbiguanide
$N^1$-3-chloro-4-bromophenyl-$N^5$-methyl-$N^5$-n-propylbiguanide
$N^1$-3-chloro-4-iodophenyl-$N^5$-isopropylbiguanide
$N^1$-3-chloro-4-iodophenyl-$N^5$-methyl-$N^5$-isopropylbiguanide
$N^1$-3-chloro-4-iodophenyl-$N^5$-n-propylbiguanide
$N^1$-3-chloro-4-iodophenyl-$N^5$-methyl-$N^5$-n-propylbiguanide
$N^1$-3:5-dichloro-4-bromophenyl-$N^5$-isopropylbiguanide Other specific compounds of this invention include:

$N^1$-m-bromophenyl-$N^5$-methyl-$N^5$-isopropylbiguanide
$N^1$-m-bromophenyl-$N^5$-methyl-$N^5$-n-propylbiguanide
$N^1$-m-iodophenyl-$N^5$-methyl-$N^5$-isopropylbiguanide
$N^1$-m-iodophenyl-$N^5$-methyl-$N^5$-n-propylbiguanide
$N^1$-3:4-dibromophenyl-$N^5$-ethylbiguanide
$N^1$-3:4-dibromophenyl-$N^5$-methyl-$N^5$-n-propylbiguanide
$N^1$-3-bromo-4-iodophenyl-$N^5$-methyl-$N^5$-propylbiguanide
$N^1$-3-iodo-4-bromophenyl-$N^5$-methyl-$N^5$-isopropylbiguanide
$N^1$-3-iodo-4-bromophenyl-$N^5$-n-propylbiguanide
$N^1$-3:4-diiodophenyl-$N^5$-ethylbiguanide
$N^1$-3:4-diiodophenyl-$N^5$-methyl-$N^5$-n-propylbiguanide
$N^1$-3:4-diiodophenyl-$N^5$-n-propylbiguanide
$N^1$-3:5-dichloro-4-bromophenyl-$N^5$-ethylbiguanide
$N^1$-3:5-dichloro-4-bromophenyl-$N^5$-n-propylbiguanide
$N^1$-3:5-dichloro-4-bromophenyl-$N^5$-methyl-$N^5$-isopropylbiguanide
$N^1$-3:5-dichloro-4-bromophenyl-$N^5$-methyl-$N^5$-n-propylbiguanide
$N^1$-4-iodo-3-methylphenyl-$N^5$-isopropylbiguanide
$N^1$-4-iodo-3-methylphenyl-$N^5$-n-propylbiguanide
$N^1$-4-iodo-3-methylphenyl-$N^5$-ethylbiguanide
$N^1$-4-iodo-3-methylphenyl-$N^5$-methyl-$N^5$-isopropylbiguanide
$N^1$-4-iodo-3-methylphenyl-$N^5$-methyl-$N^5$-n-propylbiguanide
$N^1$-4-bromo-3-methylphenyl-$N^5$-isopropylbiguanide
$N^1$-4-bromo-3-methylphenyl-$N^5$-ethylbiguanide
$N^1$-4-bromo-3-methylphenyl-$N^5$-n-propylbiguanide
$N^1$-4-bromo-3-methylphenyl-$N^5$-methyl-$N^5$-isopropylbiguanide
$N^1$-4-bromo-3-methylphenyl-$N^5$-methyl-$N^5$-n-propylbiguanide
$N^1$-3-iodo-1-methylphenyl-$N^5$-isopropylbiguanide
$N^1$-3-iodo-4-methylphenyl-$N^5$-n-propylbiguanide
$N^1$-3-iodo-4-methylphenyl-$N^5$-ethylbiguanide
$N^1$-3-iodo-4-methylphenyl-$N^5$-methyl-$N^5$-iodophenylbiguanide
$N^1$-3-iodo-4-methylphenyl-$N^5$-methyl-$N^5$-n-propylbiguanide
$N^1$-3-bromo-4-methylphenyl-$N^5$-isopropylbiguanide
$N^1$-3-bromo-4-methylphenyl-$N^5$-ethylbiguanide
$N^1$-3-bromo-4-methylphenyl-$N^5$-n-propylbiguanide
$N^1$-3-bromo-4-methylphenyl-$N^5$-methyl-$N^5$-isopropylbiguanide
$N^1$-3-bromo-4-methylphenyl-$N^5$-methyl-$N^5$-n-propylbiguanide
$N^1$-3-bromophenyl-$N^1$-methyl-$N^5$-isopropylbiguanide
$N^1$-3-iodophenyl-$N^1$-methyl-$N^5$-isopropylbiguanide
$N^1$-3-iodo-4-chlorophenyl-$N^1$-methyl-$N^5$-isopropylbiguanide
$N^1$-3-bromo-4-methylphenyl-$N^1$-methyl-$N^5$-isopropylbiguanide
$N^1$-4-iodo-3-methylphenyl-$N^1$-methyl-$N^5$-isopropylbiguanide All these substances may be made by one or more of the methods hereinbefore set forth.

The new compounds are strong bases; they form stable salts with organic and inorganic acids which in many cases are freely soluble in water. The salts may be made by treating the biguanide in water with the appropriate acid and then removing the water, but they are more conveniently obtained in a dry form by mixing the components together in an organic solvent such as for example acetone, or an alcohol, in which the salt is sparingly soluble. For use chemotherapeutically it is frequently an advantage to apply the new compounds in the form of their salts, especially those salts which are water-soluble. For this purpose there may be used for example the acetates, propionates, butyrates, crononates, formates, malonates, succinates, glycollates, tartrates, citrates, hydrochlorides, nitrates, sulphates, lactates, methane-sulphonates, methylenedisalicylates, or the methylene-bis-β-hydroxynapthoates, or the glycine salts, but it will be understood that many other salts may equally be used, it being understood that for use in the treatment of human malaria it is not desirable to use the salt of an acid which, of itself, possesses toxic properties.

The following examples illustrate but do not limit the invention. The parts are by weight.

Example 1

3.66 parts of n-propylamine hydrochloride, 7.2 parts of m-iodophenyldicyandiamide and 21.5 parts of nitrobenzene are heated together at 135° C. for 16 hours. On cooling the semi-solid mass obtained is digested with 7% hydrochloric acid and ether, the mixture filtered and the two layers in the filtrate separated. The acid aqueous solution is made slightly alkaline with ammonia and the solid precipitated is filtered off, washed with acetone and crystallised from water. $N^1$-m-iodophenyl-$N^5$-n-propylbiguanide hydrochloride, M. P. 208–209° C. is thus obtained as colourless prisms.

By working in the manner described in Example 1 using other appropriate intermediates, there are obtained the following further biguanides.

Example 2

$N^1$-4-chloro-3-bromophenyl - $N^5$ - n - propylbiguanide hydrochloride of M. P. 197–198° C.

Example 3

$N^1$-p-iodophenyl - $N^5$ - isobutylbiguanide hydrochloride of M. P. 231–231.5° C.

Example 4

$N^1$-3-bromo-4-iodophenyl - $N^5$ - n - propylbiguanide hydrochloride of M. P. 227–228° C.

Example 5

$N^1$-3-bromo-4-iodophenyl-$N^5$-ethylbiguanide hydrochloride of M. P. 220–221° C.

Example 6

$N^1$-3:4-dibromophenyl-$N^5$-n-propylbiguanide hydrochloride of M. P. 217.5–218° C.

Example 7

$N^1$-m-iodophenyl-$N^5$-ethylbiguanide hydrochloride of M. P. 226–227° C.

Example 8

$N^1$-m-bromophenyl-$N^5$-ethylbiguanide hydrochloride of M. P. 216–217° C.

Example 9

$N^1$-4-chloro-3-bromophenyl-$N^5$-ethylbiguanide hydrochloride of M. P. 215–216° C.

Example 10

$N^1$-4-bromo-3-iodophenyl-$N^5$-ethylbiguanide hydrochloride of M. P. 200–201° C.

Example 11

$N^1$-4-chloro-3-iodophenyl-$N^5$-n-propylbiguanide hydrochloride of M. P. 198–199° C.

Example 12

$N^1$-4-chloro-3-bromophenyl-$N^5$-methyl-$N^5$-n-propylbiguanide hydrochloride of M. P. 232–232.5° C.

Example 13

$N^1$-3:4-dibromophenyl - $N^5$ - methyl - $N^5$ - isopropylbiguanide hydrochloride of M. P. 234–235° C.

Example 14

$N^1$ - 4 - chloro - 3-bromophenyl-$N^5$-methyl-$N^5$-isopropylbiguanide hydrochloride of M. P. 240–241° C.

Example 15

$N^1$-p-bromophenyl-$N^5$ - methyl - $N^5$-n-propylbiguanide hydrochloride of M. P. 237° C.

Example 16

$N^1$-3-chloro-4-iodophenyl - $N^5$ - methyl-$N^5$-n-propylbiguanide hydrochloride of M. P. 229–230° C.

Example 17

$N^1$-3:4 - diiodophenyl-$N^5$-methyl-$N^5$-isopropylbiguanide hydrochloride of M. P. 235° C.

Example 18

$N^1$ - 4 - bromo-3-iodophenyl-$N^5$-methyl-$N^5$-isopropylbiguanide hydrochloride of M. P. 241–242° C.

Example 19

$N^1$ - 4 - bromo-3-iodophenyl - $N^5$-methyl-$N^5$-n-propylbiguanide hydrochloride of M. P. 208–209° C.

Example 20

$N^1$ - p - iodophenyl - $N^5$-methyl-$N^5$-n-propylbiguanide hydrochloride of M. P. 238° C.

Example 21

$N^1$ - 4 - chloro-3-iodophenyl-$N^5$-methyl-$N^5$-n-propylbiguanide hydrochloride of M. P. 205–206° C.

Example 22

$N^1$ - 4 - chloro-3-iodophenyl-$N^5$-methyl-$N^5$-isopropylbiguanide hydrochloride of M. P. 239–240° C.

Example 23

23 parts of p-bromoaniline are suspended in water and sufficient hydrochloric acid is added to give a solution just acid to Congo red. This solution is then diluted to 375 parts with water and 12.6 parts of $N^3$-isopropyl-dicyandiamide are added. The mixture is refluxed for 3 hours and then allowed to cool. The solid which separates is filtered off and washed with a little water. Recrystallisation from water after clarification of the solution with decoloursing charcoal gives a product which has a brownish tinge and a faint odour of p-bromoaniline. It is suspended in a little dry acetone, stirred for 10 minutes, then filtered and washed with a little acetone. A further recrystallisation from water gives pure $N^1$-p-bromophenyl-$N^5$-isopropylbiguanide hydrochloride which melts at 246° C.

Example 24

A mixture of 12.6 parts of $N^3$-isopropyldicyandiamide, 24.3 parts of 3-chloro-4-bromoaniline hydrochloride and 100 parts of β-ethoxyethanol is heated under reflux for 3 hours. It is then allowed to cool and the crystals which separate are filtered off and washed with a little β-ethoxyethanol. A further crop of crystals is obtained by the addition of 3 volumes of ethyl acetate to the mother liquor. The total material thus obtained is dissolved in hot alcohol, the solution is clarified by refluxing for 15 minutes with decolourising carbon, then filtered and allowed to cool and crystallise. There is thus obtained $N^1$-3-chloro-4-bromophenyl-$N^5$-isopropylbiguanide hydrochloride which melts at 226° C.

Example 25

A mixture of 12.6 parts of $N^3$-isopropyldicyandiamide, 26 parts of p-iodoaniline hydrochloride and 100 parts of β-ethoxyethanol is heated under reflux for 3 hours. It is then cooled, 200 parts of ethyl acetate are added and the mixture is allowed to stand for 1 hour. The crystals which separate are filtered off and washed with a mixture of β-ethoxyethanol and ethyl acetate. They are then dissolved in hot water, the solution is clarified by refluxing for 10 minutes with decolourising carbon, then filtered and allowed to cool. The crystals which separate are filtered off, washed and dried. There is thus obtained $N^1$-p-iodophenyl-$N^5$-isopropylbiguanide hydrochloride, which melts at 239° C.

Example 26

A mixture of 14 parts of $N^3$-methyl-$N^3$-isopropyldicyandiamide, 28 parts of p-iodoaniline hydrochloride and 200 parts of β-ethoxyethanol is heated under reflux for 1 hour. The mixture is allowed to cool and the crystals which separate are filtered off and washed with a little β-ethoxyethanol. They are then dissolved in hot water and the solution is clarified by boiling for 10 minutes with decolourising carbon, then filtered and allowed to cool. The crystals which separate are filtered off, washed and dried. There is thus obtained $N^1$-p-iodophenyl-$N^5$-methyl-$N^5$-isopropylbiguanide hydrochloride, which melts at 243-4° C.

Example 27

A mixture of 4.1 parts of $N^3$-ethyldicyandiamide, 8.0 parts of p-bromoaniline hydrochloride and 20 parts of β-ethoxyethanol is boiled under reflux for 105 minutes. It is then cooled and the crystalline solid is filtered off and dissolved in dilute hydrochloric acid. The solution is filtered, neutralised with ammonia and salted out with common salt. The $N^1$-p-bromophenyl-$N^5$-ethylbiguanide hydrochloride thereby precipitated is filtered off and purified by crystallisation from water. It has M. P. 233–234° C.

By working in a similar manner using appropriate intermediates there may also be made the following substances:

Example 28

$N\alpha$-m-bromophenyl-$N\omega$-isopropylbiguanide hydrochloride, M. P. 226° C.

Example 29

$N\alpha$-p-bromophenyl-$N\omega$-n-propylbiguanide hydrochloride which crystallises from water in colourless plates, M. P. 221–222° C.

Example 30

$N\alpha$-p-bromophenyl-$N\omega$-methyl-$N\omega$-isopropylbiguanide monohydrochloride which crystallises from water in colourless needles, M. P. 251° C.

Example 31

$N^1$-3:5-dichloro-4-bromophenyl-$N^5$-isopropylbiguanide hydrochloride, M. P. 244–245° C.

Example 32

$N^1$-3-iodophenyl-$N^5$-isopropylbiguanide hydrochloride, M. P. 246° C.

Example 33

$N^1$-4-chloro-3-bromophenyl-$N^5$-isopropylbiguanide hydrochloride, M. P. 239° C.

Example 34

$N^1$-4-iodo-3-bromophenyl-$N^5$-isopropylbiguanide hydrochloride, M. P. 236° C.

Example 35

$N^1$-3:4-dibromophenyl-$N^5$-isopropylbiguanide hydrochloride, M. P. 240° C.

Example 36

$N^1$-4-bromo-3-iodophenyl-$N^5$-isopropylbiguanide hydrochloride, M. P. 239° C.

Example 37

$N^1$-3:4-diiodophenyl-$N^5$-isopropylbiguanide hydrochloride, M. P. 237° C.

Example 38

$N^1$-4-chloro-3-iodophenyl-$N^5$-isopropylbiguanide hydrochloride, M. P. 238° C.

Example 39

$N^1$-p-bromophenyl-$N^5$-sec.butylbiguanide hydrochloride, M. P. 255–256° C.

Example 40

$N^1$-3-chloro-4-bromophenyl-$N^5$-ethylbiguanide hydrochloride, M. P. 217° C.

Example 41

$N^1$-3-chloro-4-bromophenyl-$N^5$-n-propylbiguanide hydrochloride, M. P. 217° C.

Example 42

$N^1$-3-chloro-4-iodophenyl-$N^5$-ethylbiguanide hydrochloride, M. P. 226–227° C.

Example 43

$N^1$-3-chloro-4-iodophenyl-$N^5$-n-propylbiguanide hydrochloride, M. P. 225° C.

Example 44

$N^1$-m-bromophenyl-$N^5$-n-propylbiguanide hydrochloride, M. P. 194–195° C.

Example 45

$N^1$-p-iodophenyl-$N^5$-ethylbiguanide hydrochloride, M. P. 239–240° C.

Example 46

$N^1$-p-iodophenyl-$N^5$-n-propylbiguanide hydrochloride, M. P. 222–224° C.

Example 47

$N^1$-p-iodophenyl-$N^5$-n-butylbiguanide hydrochloride, M. P. 207° C.

Example 48

$N^1$-4-chloro-3-iodophenyl-$N^5$-ethylbiguanide hydrochloride, M. P. 197–198° C.

Example 49

$N^1$-3-chloro-4-bromophenyl-$N^5$-methyl-$N^5$-n-propylbiguanide hydrochloride, M. P. 234° C.

Example 50

$N^1$-3-chloro-4-bromophenyl-$N^5$-methyl-$N^5$-isopropylbiguanide hydrochloride, M. P. 244° C.

Example 51

$N^1$-3- chloro -4-iodophenyl-$N^5$-methyl-$N^5$-isopropylbiguanide hydrochloride, M. P. 231° C.

Example 52

To a solution of 8.7 parts of N-n-butylguanylthiourea (M. P. 144–5° C.), made by interaction of N-n-butyldicyandiamide and hydrogen sulphide in 40 parts of acetone at 50° C., there are added 8 parts of methyliodide. The mixture is then allowed to stand for 2 hours and is then evaporated to dryness under diminished pressure. The residue is dissolved in 25 parts of water, 8 parts of bromoaniline added, and the mixture is boiled gently under reflux condenser for 22 hours. The solution is then made just alkaline to Brilliant Yellow with ammonia and unreacted p-bromoaniline is removed by distillation in steam. To the residual solution 50 parts of water are added and it is then made acid to Congo red by addition of hydrochloric acid. It is then cooled and filtered and the filtrate is added to an excess of caustic soda and the mixture is then extracted with 50 parts of benzene. The benzene solution is washed with water, then shaken with 75 parts of 7% hydrochloric acid at 30–40° C. The aqueous layer is then separated and treated with ammonia until the solution is just alkaline to Brilliant Yellow. The precipitated solid is filtered off, washed with water, redissolved in 7% hydrochloric acid and reprecipitated by addition of ammonia. The last procedure is repeated and the solid is then crystallised twice from water. There is obtained $N^1$-p-bromophenyl-$N^5$-n-butylbiguanide hydrochloride which has M. P. 215° C.

Example 53

10.6 parts of p-bromophenylguanidine hydrate and 25 parts of pentanol are mixed, heated to the boil and 15 parts of pentanol distilled from the mixture. 3.9 parts of diethylcyanamide are then added to the dry pentanol solution of the guanidine and the mixture is boiled under reflux for 2.5 hours. The reaction mixture is cooled and diluted with 50 parts of benzene and the whole is extracted with 10 parts of 7% hydrochloric acid. The acid extract is made alkaline with excess sodium hydroxide solution and filtered. The solid is crystallised from petroleum ether and there is obtained $N^1$-p-bromophenyl-$N^5$:$N^5$-diethylbiguanide as colourless plates, M. P. 140–141° C.

By working in a similar manner and using other appropriate starting materials there may be obtained the following further biguanides.

Example 54

$N^1$-p-bromophenyl-$N^5$-isobutylbiguanide; its monohydrochloride crystallises from water in colourless plates, M. P. 237–238° C.

Example 55

$N^1$-p- bromophenyl -$N^5$- methyl -$N^5$-n-butylbiguanide; it crystallises from petroleum ether in colourless plates, M. P. 123–124° C.

Example 56

$N^1$-p- bromophenyl -$N^5$-dimethylbiguanide; it crystallises from ethanol in colourless needles, M. P. 175–176° C.

Example 57

$N^1$-p-bromophenyl-$N^5$-cyclohexylbiguanide; it crystallises from benzene in colourless plates, M. P. 181–182° C.; its monohydrochloride crystallises from water in colourless needles, M. P. 252–253° C.

While it will be understood that medical utility in the treatment of human malaria may formally be assessed only after extensive clinical trials, it has been found that in this class of compounds the efficacy of a substance in avian malaria, particularly in *Plasmodium gallinaceum* infection of chicks, is a good indication of its utility in the treatment of human malaria. Moreover efficacy against exoerythrocytic forms of avian malaria organisms in this class of compounds is generally indicative of utility as a causal prophylactic in human malaria. Utility as a causal prophylactic is a very desirable feature of an antimalarial agent and this feature is not possessed by quinine. Quinine is merely curative and, to a degree, clinically prophylactic, these properties being generally indicated by efficacy against the erythrocytic forms in avian malaria. Thus, the compounds of the present invention possess a very important advantage in comparison with quinine. Yet a further advantage presented especially by some of the compounds of the present invention is that we have found that they are effective at a dosage which is much smaller in relation to the toxic dose than is the case with many pre-existing antimalarial agents.

Moreover, as indicated above, the compounds of the present invention are readily made by a number of relatively simple chemical processes and from cheap, or potentially cheap, starting materials. For this they show a clear advantage over many already-known synthetic antimalarial agents, notably over Mepacrine which is 2-chloro-3-(ω - diethylamino - α - methylbutylamino) - 7-methoxyacridine. Also being colourless, they do not possess the undesirable property of staining the skin of the patient.

We claim:

1. A compound selected from the group consisting of the free base form and salts of the biguanides of the general formula:

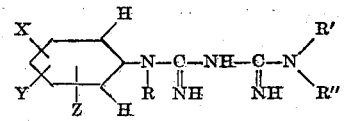

wherein R is a radical from the group consisting of hydrogen and 1 to 3 carbon atom alkyl; R' is a lower alkyl radical; R'' is a radical from the group consisting of hydrogen and lower alkyl, with the sum of the carbon atoms of radicals R' plus R'' being between 1 and 8 inclusive; X and Y are radicals from the group consisting of hydrogen, halogen and 1 to 3 carbon atom alkyl, and Z is a radical of a halogen atom of atomic weight greater than chlorine.

2. A compound of the formula:

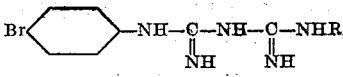

wherein R' is a lower alkyl radical.

3. A compound of the formula

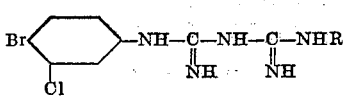

wherein R' is a lower alkyl radical.

4. A compound of the formula:

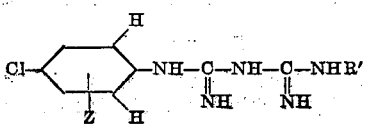

wherein R' is a lower alkyl radical and Z is a radical of a halogen atom of atomic weight greater than chlorine.

5. A compound of the formula:

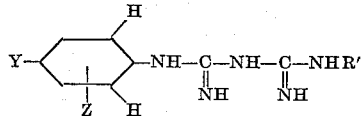

wherein Y is a radical of a halogen atom of atomic weight greater than fluorine, Z is a radical of a halogen atom of atomic weight greater than chlorine and R' is a lower alkyl radical.

6. $N^1$-p-bromophenyl-$N^5$-isopropylbiguanide.

7. $N^1$-3-chloro-4-bromophenyl-$N^5$-isopropylbiguanide.

8. $N^1$-3-iodo-4-chlorophenyl-$N^5$-isopropylbiguanide.

9. $N^1$-p-iodophenyl-$N^5$-isopropylbiguanide.

10. $N^1$-3:4-dibromophenyl-$N^5$-isopropylbiguanide.

MURIEL RUTH CURD.
*Sole executrix of the late Francis Henry Swinden Curd.*

FRANCIS LESLIE ROSE.

REFERENCES CITED

The following references are of record in the file of this patent:

UNITED STATES PATENTS

| Number | Name | Date |
|---|---|---|
| 2,455,896 | Nagy | Dec. 7, 1948 |
| 2,467,371 | Curd et al. | Apr. 19, 1949 |
| 2,475,081 | Curd et al. | July 5, 1949 |

OTHER REFERENCES

Official Gazette, U. S. Patent Office, June 21, 1949, p. 878.